United States Patent
Watanabe et al.

(10) Patent No.: US 7,804,046 B2
(45) Date of Patent: Sep. 28, 2010

(54) ACOUSTIC HEATER AND ACOUSTIC HEATING SYSTEM

(75) Inventors: Yoshiaki Watanabe, Kyoto (JP); Shinichi Sakamoto, Osaka (JP)

(73) Assignee: The Doshisha, Kyoto-shi (JP)

( * ) Notice: Subject to any disclaimer, the term of this patent is extended or adjusted under 35 U.S.C. 154(b) by 1037 days.

(21) Appl. No.: 10/594,277

(22) PCT Filed: Mar. 23, 2005

(86) PCT No.: PCT/JP2005/005219

§ 371 (c)(1),
(2), (4) Date: Sep. 26, 2006

(87) PCT Pub. No.: WO2005/093339

PCT Pub. Date: Oct. 6, 2005

(65) Prior Publication Data

US 2007/0221367 A1 Sep. 27, 2007

(30) Foreign Application Priority Data

Mar. 26, 2004 (JP) ............................. 2004-091683

(51) Int. Cl.
*H05B 1/02* (2006.01)

(52) U.S. Cl. .................. 219/482; 219/121.52; 219/494; 205/91; 62/6

(58) Field of Classification Search ........... 219/482, 219/494, 505, 121.52; 315/111.51; 62/6; 205/91

See application file for complete search history.

(56) References Cited

U.S. PATENT DOCUMENTS

| | | | | |
|---|---|---|---|---|
| 5,647,216 A | * | 7/1997 | Garrett | ............................ 62/6 |
| 6,032,464 A | | 3/2000 | Swift et al. | |
| 6,164,073 A | * | 12/2000 | Swift et al. | ................... 60/721 |
| 6,368,482 B1 | * | 4/2002 | Oeftering et al. | ............. 205/91 |

FOREIGN PATENT DOCUMENTS

| | | |
|---|---|---|
| JP | 2000-88378 A | 3/2000 |
| JP | 2002-31423 A | 1/2002 |
| WO | WO 00/43639 A1 | 7/2000 |

OTHER PUBLICATIONS

International Search Report of PCT/JP2005/005219, date of mailing: Jul. 5, 2005.

* cited by examiner

*Primary Examiner*—Mark H Paschall
(74) *Attorney, Agent, or Firm*—Westerman, Hattori, Daniels & Adrian, LLP

(57) ABSTRACT

In order that an object can be warmed through the use of thermoacoustic effect, the acoustic heating apparatus includes a first stack 3a sandwiched between a high-temperature-side heat exchanger 4 and a low-temperature input-side heat exchanger 5 in a first tube portion 2a and a second stack 3b sandwiched between a low-temperature-side heat exchanger 6 and a high-temperature output-side heat exchanger 7 in a second tube portion 2b. A standing wave and a traveling wave are generated through self excitation in the first tube portion 2a by cooling the low-temperature input-side heat exchanger 5 to minus 20° C. to 60° C. A temperature gradient is generated in the second stack 3b by propagating the resulting standing wave and the traveling wave to the second tube portion 2b, and high-temperature heat is output due to this temperature gradient from the high-temperature output-side heat exchanger 7 disposed on the second stack 3b side.

12 Claims, 6 Drawing Sheets

ACOUSTIC HEATER AND ACOUSTIC HEATING SYSTEM

TECHNICAL FIELD

The present invention relates to a heat exchange apparatus through the use of thermoacoustic effect and a system thereof.

BACKGROUND ART

Known technologies of a heat exchange apparatus through the use of acoustic effect include the technologies described in the following Patent Document 1, Non-Patent Document 1, and the like.

The apparatus described in Patent Document 1 relates to a cooling apparatus through the use of thermoacoustic effect. A stack sandwiched between a high-temperature-side heat exchanger and a low-temperature-side heat exchanger and a regenerator formed from, for example, a stack sandwiched between a high-temperature-side heat exchanger and a low-temperature-side heat exchanger, are disposed in the inside of a loop tube, in which a gas is enclosed. A temperature gradient is generated in the stack by heating the high-temperature-side heat exchanger on the stack side, and thermal energy is transferred from the high-temperature-side heat exchanger to the low-temperature-side heat exchanger in this stack. An acoustic wave is generated through self excitation in such a way that the acoustic energy is transferred in a direction opposite to the thermal energy transfer direction on the basis of the energy conservation low, and the acoustic energy due to an acoustic wave is propagated to the regenerator side. Subsequently, thermal energy is transferred in a direction opposite to the acoustic energy propagation direction on the regenerator side and, thereby, the low-temperature-side heat exchanger is cooled.

Likewise, Non-Patent Document 1 discloses a cooling apparatus through the use of thermoacoustic effect, and discloses an experimental study by using the cooling apparatus. The cooling apparatus used in this experiment is also configured to include a first stack sandwiched between a heater (high-temperature-side heat exchanger) and a low-temperature-side heat exchanger in the inside of a metal loop tube and a second stack which is disposed in the loop tube at a position opposite to the first stack and which has a low-temperature-side heat exchanger. A large temperature gradient is generated in the first stack by heating the heater (high-temperature-side heat exchanger) disposed on the first stack side and, in addition, circulating running water in the low-temperature-side heat exchanger, and an acoustic wave is generated through self excitation in a direction opposite to the temperature gradient. The resulting acoustic energy is propagated to the regenerator side through the loop tube, and on the second stack side, the acoustic energy is converted to the thermal energy, so as to cool the vicinity of a thermometer disposed on the other end side of the second stack. According to this document, a temperature reduction of about 16° C. has been ascertained under a predetermined condition at the portion where the thermometer has been disposed.

In general, it is desired that such a cooling apparatus through the use of thermoacoustic effect is used as a cooler for a cabin or an apparatus for cooling heat-producing equipment, e.g., a household electric appliance, a notebook personal computer, communications equipment, a game machine, an automobile, and office equipment.

Patent Document 1: Japanese Unexamined Patent Application Publication No. 2000-88378

Non-Patent Document 1: Shinichi SAKAMOTO, Kazuhiro MURAKAMI, and Yoshiaki WATANABE, "Netsuonkyou Koukao Mochiita Onkyoureikyaku Genshouno Jikkenteki Kentou (Experimental Study of Acoustic Cooling Phenomenon Through the Use of Thermoacoustic Effect)", The Institute of Electronics, Information and Communication Engineers, TECHNICAL REPORT OF IEICE. US2002-118 (2003-02)

DISCLOSURE OF INVENTION

Problems to be Solved by the Invention

However, the above-described cooler is for cooling a cabin or an intended object. However, under a very cold environment, for example, in cold climates, where an external temperature reaches −20° C. to −60° C., it is desired to warm a cabin rather than to cool the cabin or the like. Since all the heat exchangers through the use of acoustic effect, which have been proposed previously, are for cooling a cabin or an intended object, they are not suitable for use in cold climates, and the like.

Accordingly, in order to overcome the above-described problems, it is an object of the present invention to provide an apparatus capable of warming an object through the use of thermoacoustic effect and a system thereof.

Means for Solving the Problems

In order to overcome the above-described problems, in a configuration according to an aspect of the present invention, a first stack sandwiched between a high-temperature-side heat exchanger and a low-temperature input-side heat exchanger is included in a first tube portion and a second stack sandwiched between a low-temperature-side heat exchanger and a high-temperature output-side heat exchanger is included in a second tube portion, wherein a temperature gradient is generated in the second stack by propagating a standing wave and a traveling wave generated in a loop tube from the first stack to the second stack, and heat is output from the high-temperature output side heat exchanger disposed on the second stack side.

According to this configuration, a cabin or an intended object can be warmed through the use of external heat at a low temperature (hereafter referred to as "low-temperature heat") and, therefore, a heat exchange apparatus useful in cold climates and the like can be obtained. Such an apparatus can also be used as a thermostat against overcooling. Furthermore, since the thermoacoustic effect is used in such an apparatus, heating can be performed by a relatively simple configuration without using a medium, e.g., a chlorofluorocarbon, which has a problem in environmental protection, or a power source, e.g., a compressor.

The loop tube includes the first tube portion and the second tube portion, which are disposed while standing relative to the ground, and connection tube portions connecting the first tube portion to the second tube portion.

According to this configuration, the low-temperature heat input into the low-temperature input-side heat exchanger can be released below the standing tube portion, and a large temperature gradient can be generated in the stack, so that an acoustic wave can be generated through self excitation rapidly. Consequently, the efficiency of the heat exchange can be improved.

The first stack disposed in the first tube portion is located at a level higher than the level of the second stack disposed in the second tube portion.

According to this configuration, a large in-tube space can be ensured below the low-temperature input-side heat exchanger and, thereby, a cold gas from the low-temperature input-side heat exchanger can be released downward, so that a large temperature gradient can be generated. Consequently, an acoustic wave can be generated through self excitation more rapidly and, thereby, the efficiency of the heat exchange can be improved.

The high-temperature-side heat exchanger, the first stack, and the low-temperature input-side heat exchanger are disposed in that order from above in the first tube portion.

According to this configuration, the cold gas from the low-temperature input-side heat exchanger can be prevented from flowing into the first stack, and the generation of acoustic wave through self excitation due to generation of a large temperature gradient can be facilitated. Consequently, the efficiency of the heat exchange can be improved.

When one end of the first tube portion is connected to one end of the connection tube portion, an intersection of the respective center axes is assumed to be a start point of a circuit, and an entire length of the circuit is assumed to be 1.00, the center of the first stack is set at a position corresponding to $0.28 \pm 0.05$ relative to the entire length of the circuit.

According to this configuration, when the respective temperatures of the high-temperature-side heat exchanger and the low-temperature input-side heat exchanger in the first stack are appropriate, the acoustic wave can be generated through self excitation more rapidly.

When an entire length of the circuit is assumed to be 1.00, a first peak of the pressure variation of a working fluid along the circuit is present in the vicinity of the first stack, and a second peak is present at a position corresponding to about one-half the entire length of the circuit, the above-described second stack is disposed in such a way that the center of the above-described second stack is positioned past the above-described second peak.

According to this configuration, the cooling efficiency or the heating efficiency in the second stack can be increased.

When the loop tube is configured as described above, the first tube portion and the second tube portion are set to be longer than the above-described connection tube portion.

According to this configuration, since the size of the tube in the vertical direction is increased, a large space for releasing the cold gas or a warm gas can be ensured. Consequently, the generation of acoustic wave through self excitation due to generation of a large temperature gradient can be facilitated. The disturbance of surface wavefront can be reduced by increasing the length of the first tube portion, and the standing wave and the traveling wave can be generated efficiently.

The shapes of corner portions at the boundaries between the first tube portion and the connection tube portion and between the second tube portion and the connection tube portion are shapes suitable for totally reflecting the standing wave and the traveling wave between the connection tube portion and the tube portions.

According to this configuration, the standing wave and the traveling wave which propagate in the loop tube, are prevented from being reflected backward. Consequently, the energy is prevented from being lost and the acoustic energy can be propagated efficiently.

An acoustic wave generator for generating a standing wave and a traveling wave is disposed on the outer perimeter portion or in the inside of the loop tube.

According to this configuration, the standing wave and the traveling wave can be generated more rapidly not only by the acoustic wave through self excitation, but also by forced vibration from the acoustic wave generator.

Alternatively, the first stack or/and the second stack include meandering connection channels.

According to this configuration, since large surface areas of the working fluid and the stack can be ensured, the heat exchange with the working fluid is facilitated and, thereby, higher-temperature heat can be output. Furthermore, since the surface areas of the working fluid and the stack are increased, the length of the stack can be decreased. Consequently, the entire apparatus can be made compact.

A material for the first stack or/and the second stack is composed of at least one type of ceramic, sintered metal, gauze, and nonwoven metal fabric, and the $\omega\tau$ ($\omega$: an angular frequency of the working fluid, $\tau$: temperature relaxation time) thereof is configured to become within the range of 0.2 to 20.

According to this configuration, an acoustic wave can be generated through self excitation more rapidly and efficiently.

A plurality of acoustic heating apparatuses as described above are disposed, and a high-temperature output-side heat exchanger in one acoustic heating apparatus is connected to a high-temperature-side heat exchanger in another acoustic heating apparatus adjacent thereto.

According to this configuration, since the temperature gradient in the first stack is increased one after another on an adjacent acoustic heating apparatus basis, higher-temperature heat can be output from the acoustic heating apparatus on the end side.

Advantages

In an aspect of the present invention, the first stack sandwiched between the high-temperature-side heat exchanger and the low-temperature input-side heat exchanger is included in the first tube portion, the second stack sandwiched between the low-temperature-side heat exchanger and the high-temperature output-side heat exchanger is included in the second tube portion, a temperature gradient is generated in the second stack by propagating a standing wave and a traveling wave generated in the loop tube from the first stack to the second stack, and heat is output from the high-temperature output side heat exchanger disposed on the second stack side. Therefore, a cabin or an intended object can be warmed through the use of low-temperature heat in a cold climates. Consequently, a heat exchange apparatus useful in cold climates and the like can be obtained. Furthermore, since the thermoacoustic effect is used, heating can be performed by a relatively simple configuration without using a medium, e.g., a chlorofluorocarbon, which causes a problem in environmental protection, or a power source, e.g., a compressor.

BEST MODE FOR CARRYING OUT THE INVENTION

An embodiment of an acoustic heating apparatus 1 according to an aspect of the present invention will be described below with reference to drawings.

The acoustic heating apparatus 1 in the present embodiment includes a first stack 3a sandwiched between a high-temperature-side heat exchanger 4 and a low-temperature input-side heat exchanger 5 and a second stack 3b sandwiched between low-temperature-side heat exchanger 6 and a high-temperature output-side heat exchanger 7 in the inside of a loop tube 2 configured to take on a nearly rectangular shape as a whole. A standing wave and a traveling wave are generated through self excitation by cooling the low-temperature input-side heat exchanger 5 on the first stack 3a side, and high-temperature heat can be output from the high-temperature output-side heat exchanger 7 disposed on the second stack 3b side by propagating the resulting standing wave and the traveling wave to the second stack 3b side.

The loop tube 2 includes the first tube portion 2a and the second tube portion 2b, which are disposed while standing relative to the ground (preferably, vertically), and connection tube portions 2d connected therebetween through corner portions 2c at both ends of the first tube portion 2a and the second tube portion 2b. These first tube portion 2a, second tube portion 2b, corner portions 2c, and connection tube portions 2d are composed of metal pipes. However, the material is not limited to the metal pipe, and may also be transparent glass, a resin, or the like. When these portions are composed of a material, such as the transparent glass, the resin, or the like, positions of the first stack 3a and the second stack 3b can be checked and the status in the tube can easily be observed in an experiment or the like. The length La of the first tube portion 2a and the second tube portion 2b is set to be longer than the length Lb of the connection tube portion 2d. When the length of the first tube portion 2a and the second tube portion 2b are increased as described above, a space for releasing the cold gas or a warm gas can be ensured, and the temperature gradients in the first stack 3a and the second stack 3b can be increased. Consequently, an acoustic wave can be generated rapidly from the first stack through self excitation. The shapes of corner portions 2c disposed at both ends of the first tube portion 2a and the second tube portion 2b are configured to take on shapes, e.g., an arch shape, capable of reflecting completely the acoustic wave propagated in the tube to the connection tube portion 2d and the like. FIG. 2 shows the specific configuration of this corner portion 2c. FIG. 2 is a diagram showing a magnified corner portion 2c in the upper end portion of the first tube portion 2a. Since configurations similar to the configuration of this corner portion 2c are also used for the other corner portions 2c, explanations thereof will not be provided. In FIG. 2, the corner portion 2c is configured to have an inner diameter substantially equal to the inner diameter of the first tube portion 2a and have a diameter which is substantially equal to the inner diameter of the tube and which is centering the inside corner portion of the loop tube 2. In this manner, all the acoustic energy propagated from the first tube portion 2a is reflected at the corner portion 2c, and is transferred to the connection tube portion 2d side without being returned to the first tube portion 2a. Furthermore, the inner diameter of the corner portion 2c is configured to become substantially equal to that of the first tube portion 2a and, thereby, the inner walls of the first tube portion 2a and the corner portion 2c can be made smooth. Consequently, the acoustic energy is prevented from being lost, so that the energy can be transferred efficiently. The shape of this corner portion 2c is not limited to an arch shape, and a linear shape as shown in FIG. 3 can also be used. FIG. 3 is a diagram showing a magnified linear corner portion 20c disposed between the first tube portion 2a and the connection tube portion 2d. In FIG. 3, the corner portion 20c is disposed in such a way that the outside corner portion thereof takes on a shape of a straight line set at an angle of 45 degrees that is one-half the connection angle of 90 degrees between the first tube portion 2a and the connection tube portion 2d. Consequently, all the acoustic wave propagating in the first tube portion 2a is reflected at this linear corner portion to the connection tube portion 2d side.

An inert gas, e.g., helium, argon, or a mixed gas of helium and argon, is enclosed in the inside of the loop tube 2. In the case where the loss due to the viscosity is prevented, helium having a relatively small Prandtl number is used, and in the case where the efficiency of heat exchange or heat conduction is improved, argon having a relatively large Prandtl number is used. This working fluid is not limited to the above-described inert gas, and a gas, e.g., nitrogen or air, may be enclosed. The pressure of these working fluids is set at 0.01 MPa to 5.0 MPa, and in the case where the influence of the viscosity is made small, the pressure is set at a relatively small value.

On the other hand, the first stack 3a and the second stack 3b disposed in this loop tube 2 are configured to take on a cylindrical shape which touches the inner wall of the loop tube 2, and is formed from a material, e.g., ceramic, sintered metal, gauze, or nonwoven metal fabric, which has a large heat capacity. These stacks 3a and 3b are configured to have multiple holes penetrating in the axis direction of the loop tube. In general, the stacks 3a and 3b having a plurality of fine linear connection channels are used. In place of this, as shown in FIG. 4, a stack 3c including meandering connection channels 30 (connection channel 30 indicated by a thick line) produced by laying, for example, a plurality of fine spherical ceramic may be used. When the above-described meandering connection channels 30 are disposed, a large contact area between the working fluid and the stack 3c can be ensured, and the heat exchange is increased, so that high-temperature heat can be output from the high-temperature output-side heat exchanger 7. In the case where the above-described stacks are used, the stack having fine linear connection channels may be used on the first stack 3a side in order to facilitate the generation of acoustic wave through self excitation, and the stack 3c having meandering connection channels 30 may be used in place of the second stack 3b in order that higher-temperature heat can be output. Besides them, a stack in which a plurality of mesh-shaped stainless steel sheets are laminated may also be used.

The attachment position of this first stack 3a is set at an upper portion of the first tube portion 2a, and is fixed to the position while being sandwiched between the high-temperature-side heat exchanger 4 and the low-temperature input-side heat exchanger 5. This low-temperature-side heat input device is configured by forming connection channels for passing vertically the working fluid inside a thin metal plate, and is disposed in contact with the bottom of the first stack 3a. This is cooled to a temperature of −20° C. to −60° C., for example, or lower than that by low-temperature heat from the outdoors in cold climates or the like. On the other hand, the high-temperature-side heat exchanger 4 is also configured by forming connection channels for passing vertically the working fluid inside a thin metal plate, and is disposed in contact with the top of the first stack 3a. An antifreeze liquid is circulated around it and the temperature is set at +20° C. to +30° C. or higher than that. Consequently, a temperature gradient is generated in the first stack 3a by the temperature difference between the high-temperature-side heat exchanger 4 and the low-temperature input-side heat exchanger 5, as described above, and thereby, an acoustic wave is generated through self excitation. The first stack 3a may be disposed in a lower portion of the first tube portion 2a. However, if the first stack 3a is disposed at such a position, no place is ensured for releasing the low-temperature gas from the low-temperature input-side heat exchanger 5, and the low-temperature gas enters the first stack 3a. As a result, a large temperature gradient cannot be generated in the first stack 3a, and an acoustic wave may not be generated through self excitation. Therefore, in the present embodiment, the first stack 3a is disposed at the upper portion of the first tube portion 2a, preferably above the center of the first tube portion 2a in order to ensure the place for releasing the low-temperature gas and facilitate the generation of an acoustic wave through self excitation.

With respect to the condition for the generation of the acoustic wave through self excitation in the first stack 3a, in the case where the working fluid flows in the first stack 3a, when a flow path radius of the parallel channels is assumed to be r, an angular frequency of the working fluid is assumed to be ω, a temperature diffusion coefficient is assumed to be α, and a temperature relaxation time is assumed to be $\tau (=r^2/2\alpha)$, the acoustic wave can be generated through self excitation most efficiently when ωτ is within the range of 0.2 to 20. Therefore, r, ω, and τ are set in such a way as to satisfy these relationships. Furthermore, when one end of the first tube portion 2a is connected to one end of the connection tube portion 2d in FIG. 2, an intersection of the respective center axes is assumed to be a start point of a circuit, and an entire length of the circuit is assumed to be 1.00, the acoustic wave can be generated through self excitation more rapidly and efficiently by setting the center of the first stack 3a at a position corresponding to 0.28±0.05 relative to the entire length of the circuit in a counterclockwise direction from the start point.

On the other hand, the attachment position of the second stack 3b is set in such a way that when a first peak of the pressure variation of the working fluid along the loop tube 2 is present in the vicinity of the first stack 3a, and a second peak is present at a position corresponding to about one-half the entire length of the circuit, the center of the second stack 3b is positioned past the second peak. The low-temperature-side heat exchanger 6 disposed under this second stack 3b is configured by forming connection channels for passing vertically the working fluid inside a thin metal plate, and an antifreeze liquid is circulated around it and the temperature is set at +20° C. to +30° C. or higher than that, similarly to the high-temperature output-side heat exchanger 7 disposed on the first stack 3a. On the other hand, the high-temperature output-side heat exchanger 7 is also configured by forming connection channels for passing vertically the working fluid inside a thin metal plate, and outputs heat to an object of heating. It is believed that the object of heating is air in a cabin, an automobile engine on startup, or the like, although not limited to them.

The operation state of the thus configured acoustic heating apparatus 1 will be described below.

First, an inert gas is enclosed in the loop tube 2. Under this condition, an antifreeze liquid is circulated to the high-temperature-side heat exchanger 4 of the first stack 3a and the low-temperature-side heat exchanger 6 of the second stack 3b and, in addition, the low-temperature input-side heat exchanger 5 of the first stack 3a is cooled to −20° C. to −60° C., for example. Consequently, a temperature gradient is generated in the first stack 3a due to the temperature difference between the low-temperature input-side heat exchanger 5 and the high-temperature-side heat exchanger 4, and the working fluid begins wandering minutely at first. Subsequently, this working fluid begins vibrating largely and circulates in the loop tube 2. After the expiration of a certain time interval, a standing wave and a traveling wave are generated in the loop tube 2, and acoustic energy is propagated in the direction opposite to the transfer direction of the thermal energy, from the high-temperature-side heat exchanger 4 toward the low-temperature-side heat exchanger 6 on the basis of the energy conservation law. This acoustic energy is reflected efficiently at the corner portions 2c or 20c of the loop tube 2 and the like and is propagated to the second stack 3b side. This acoustic energy is propagated from the high-temperature output-side heat exchanger 7 side toward the low-temperature-side heat exchanger 6 side on the second stack 3b side. The working fluid is allowed to shrink due to pressure variation and volume variation of the working fluid based on the standing wave and the traveling wave, and the heat released at that time is output from the high-temperature output-side heat exchanger 7. In this manner, heating through the use of the thermoacoustic effect becomes possible.

In the acoustic heating apparatus 1, the acoustic wave is generated through self excitation by the temperature gradient between the high-temperature-side heat exchanger 4 and the low-temperature input-side heat exchanger 5 disposed on the first stack 3a side. However, it takes much time until a standing wave and the traveling wave are generated simply by the above-described generation of the acoustic wave through self excitation. On the other hand, it is possible to decrease the frequencies of the standing wave and the traveling wave by changing the diameter of the loop tube 2 in order to reduce the generation time of the standing wave and the traveling wave. However, this results in an insufficient output. In this case, as shown in FIG. 5, an acoustic wave generator 8 may be disposed in order to reduce the time until the self excitation occurs.

This acoustic wave generator 8 is composed of a speaker, a piezoelectric element, or other devices which forcedly vibrate the working fluid from the outside, and is disposed along the outer perimeter surface of the loop tube 2 or in the inside of the loop tube 2. It is preferable that the acoustic wave generator 8 is attached with a distance of one-half or one-quarter the wavelength of the standing wave and the traveling wave generated, and preferably, the acoustic wave generator 8 is disposed in such a way as to forcedly vibrate the working fluid in the axis direction of the loop tube 2 in correspondence with the movement direction of the standing wave and the traveling wave. When the acoustic wave generator 8 is disposed as described above, the generation time of the standing wave and the traveling wave can be reduced, and the heat can be output from the high-temperature output-side heat exchanger 7 rapidly.

In the case where satisfactory heat releasing effect cannot be attained by the above-described acoustic heating apparatus 1 alone, an acoustic heating system 100, in which a plurality of acoustic heating apparatuses 1 are connected, as shown in FIG. 6, may be used. In FIG. 6, reference numerals 1a, 1b . . . and 1n denote acoustic heating apparatuses 1 configured as described above, and these first acoustic heating apparatus 1a, second acoustic heating apparatus 1b . . . and nth acoustic heating apparatus 1n are disposed adjacently in series. All low-temperature input-side heat exchangers 5 in these acoustic heating apparatuses 1a . . . are placed in a cold environment, e.g., outdoors, and are set at a temperature of −20° C. to −60° C. or the like. On the other hand, respective high-temperature output-side heat exchangers 7 of acoustic heating apparatuses 1a . . . are connected to the high-temperature-side heat exchangers 4 of acoustic heating apparatuses 1b . . . adjacent thereto. In this manner, the temperature gradient larger than the temperature gradient of the first stack 3a in the first acoustic heating apparatus 1a can be generated in the first stack 3a in the acoustic heating apparatus 1b adjacent thereto. Consequently, the temperature gradient of the acoustic heating apparatus in can be increased one after another toward the downstream, and the last acoustic heating apparatus in can output heat at a higher temperature. When the acoustic heating apparatuses 1a . . . are connected as described above, if each of the acoustic heating apparatuses 1a . . . is allowed to generate an acoustic wave through self excitation, it takes significantly much time until a standing wave and a traveling wave are generated in the last thermoacoustic apparatus 1n. Consequently, it is preferable that the time until a standing wave and a traveling wave are generated in each of the thermoacoustic apparatuses 1a . . . is reduced by disposing acoustic wave generators 8, in particular, on the outer perimeter surface or in the inside of the loop tube 2.

According to the above-described embodiments, the first stack 3a sandwiched between the high-temperature-side heat exchanger 4 and the low-temperature input-side heat exchanger 5 is disposed in the inside of the first tube portion 2a, the second stack 3b sandwiched between the low-temperature-side heat exchanger 6 and the high-temperature output-side heat exchanger 7 is disposed in the inside of the second tube portion 2b, the standing wave and the traveling wave are generated in the first tube portion 2a by cooling the low-temperature input-side heat exchanger 5, the temperature gradient is generated in the second stack 3b by propagating the standing wave and the traveling wave from the first tube portion 2a to the second tube portion 2b and, thereby, high-temperature heat is output from the high-temperature output-side heat exchanger 7. Therefore, for example, a cabin or an intended object can be warmed through the use of low-temperature heat in a cold climates or the like. Furthermore, since the thermoacoustic effect is used, heating can be performed by a relatively simple configuration without using a medium, e.g., a chlorofluorocarbon, which causes a problem in environmental protection, a compressor, or the like. The above-described apparatus 1 can also be used as a thermostat against overcooling.

Since the loop tube 2 including the first tube portion 2a and the second tube portion 2b, which stand relative to the ground, is used, the cold gas based on the low-temperature heat input into the low-temperature input-side heat exchanger 5 can be released below the first tube portion 2a, and a large temperature gradient can be generated in the first stack 2a, so that an acoustic wave can be generated through self excitation rapidly.

Since the first stack 3a is located at a level higher than the level of the second stack 3b, a large space for releasing a cold gas can be ensured below the low-temperature input-side heat exchanger 5 and, thereby, a large temperature gradient can be generated in the first stack 3a. Consequently, an acoustic wave can be generated through self excitation more rapidly.

Since the low-temperature input-side heat exchanger 5 is disposed under the first stack 3a and, in addition, the high-temperature-side heat exchanger 4 is disposed on the first stack 3a, the cold gas from the low-temperature input-side heat exchanger 5 can be prevented from flowing into the first stack 3a, a large temperature gradient can be generated in the first stack 3a, and the generation of acoustic wave can be facilitated.

When one end of the first tube portion 2a is connected to one end of the connection tube portion 2d, the intersection of the respective center axes is assumed to be the start point of the circuit, and the entire length of the circuit is assumed to be 1.00, the center of the first stack 3a is set at the position corresponding to 0.28±0.05 relative to the entire length of the circuit. Consequently, when the respective temperatures of the high-temperature-side heat exchanger 4 and the low-temperature input-side heat exchanger 5 in the first stack 3a are appropriate, the acoustic wave can be generated through self excitation more rapidly.

When the entire length of the circuit is assumed to be 1.00, the first peak of the pressure variation of the working fluid along the circuit is present in the vicinity of the first stack 3a, and the second peak is present at the position corresponding to about one-half the entire length of the circuit, the above-described second stack 3b is disposed in such a way that the center of the above-described second stack is positioned past the above-described second peak. Consequently, the cooling efficiency or the heating efficiency in the second stack 3b can be increased.

Since the first tube portion 2a and the second tube portion 2b are set to be longer than the connection tube portion 2d, a large space for releasing the cold gas or the warm gas can be ensured. Consequently, the generation of acoustic wave through self excitation due to generation of a large temperature gradient can be facilitated. The disturbance of surface wavefront of the acoustic wave can be reduced by increasing the length of the first tube portion, and the standing wave and the traveling wave can be generated efficiently.

The shapes of corner portions 2c and 20c at the boundaries between the first tube portion 2a and the connection tube portion 2d or/and corner portions 2c and 20c at the boundaries between the second tube portion 2b and the connection tube portion 2d are made to be arch shapes or linear shapes of 45 degrees. Consequently, the standing wave and the traveling wave, which propagate in the loop tube 2, are prevented from being reflected backward, and the acoustic energy can be propagated to the connection tube portion 2d or the like efficiently.

Since an acoustic wave generator 8 for generating the standing wave and the traveling wave is disposed on the outer perimeter portion or in the inside of the loop tube 2, the standing wave and the traveling wave can be generated in the loop tube 2 rapidly not only by the acoustic wave through self excitation, but also by forced vibration from the acoustic wave generator 8.

Alternatively, the stack 3c including meandering connection channels 30, as shown in FIG. 4, is used in place of the first stack 3a or/and the second stack 3b. Consequently, large surface areas of the working fluid and the stack 3c can be ensured, and high-temperature heat can be output on the basis of a larger amount of heat exchange. Furthermore, since the surface areas of the working fluid and the stacks 3a and 3b are increased, the lengths of the stacks can be decreased. Consequently, the entire apparatus can be made compact.

A material for the first stack or/and the second stack is composed of at least one type of ceramic, sintered metal, gauze, and nonwoven metal fabric, and the $\omega\tau$ ($\omega$: an angular frequency of the working fluid, $\tau$: temperature relaxation time) thereof is set within the range of 0.2 to 20. Consequently, an acoustic wave can be generated through self excitation more rapidly and efficiently.

A plurality of acoustic heating apparatuses 1 as described above are disposed, and a high-temperature output-side heat exchanger 7 in one acoustic heating apparatus 1a . . . is connected to a high-temperature-side heat exchanger 4 in another acoustic heating apparatus 1b . . . adjacent thereto. Consequently, the temperature gradient in the first stack 2a can be increased one after another on an adjacent acoustic heating apparatus 1a . . . basis, and a larger amount of heat can be output from the acoustic heating apparatus 1n side on the end side.

The present invention is not limited to the above-described embodiments, and can be carried out in various forms.

For example, in the above-described embodiments, explanations are conducted with reference to the loop tube 2 nearly in the shape of a rectangle as a whole. However, a partly meandering loop tube 2 may be used depending on an installation environment. In this case, it is desirable that the corner portion takes on an arch shape or the like as in the present embodiment in order to prevent the energy from being lost in the meandering portion of the loop tube. The inner diameter of the tube may be changed appropriately in consideration of the energy loss, the installation environment, and the like.

In the above-described embodiments, the case where the low-temperature heat in cold climates or the like is utilized is explained, although not limited to this. Low-temperature heat from artificially formed dry ice, liquid nitrogen, or the like may be utilized. Furthermore, low-temperature heat in a shaded portion in space may be utilized.

REFERENCE NUMERALS

Figure 1:
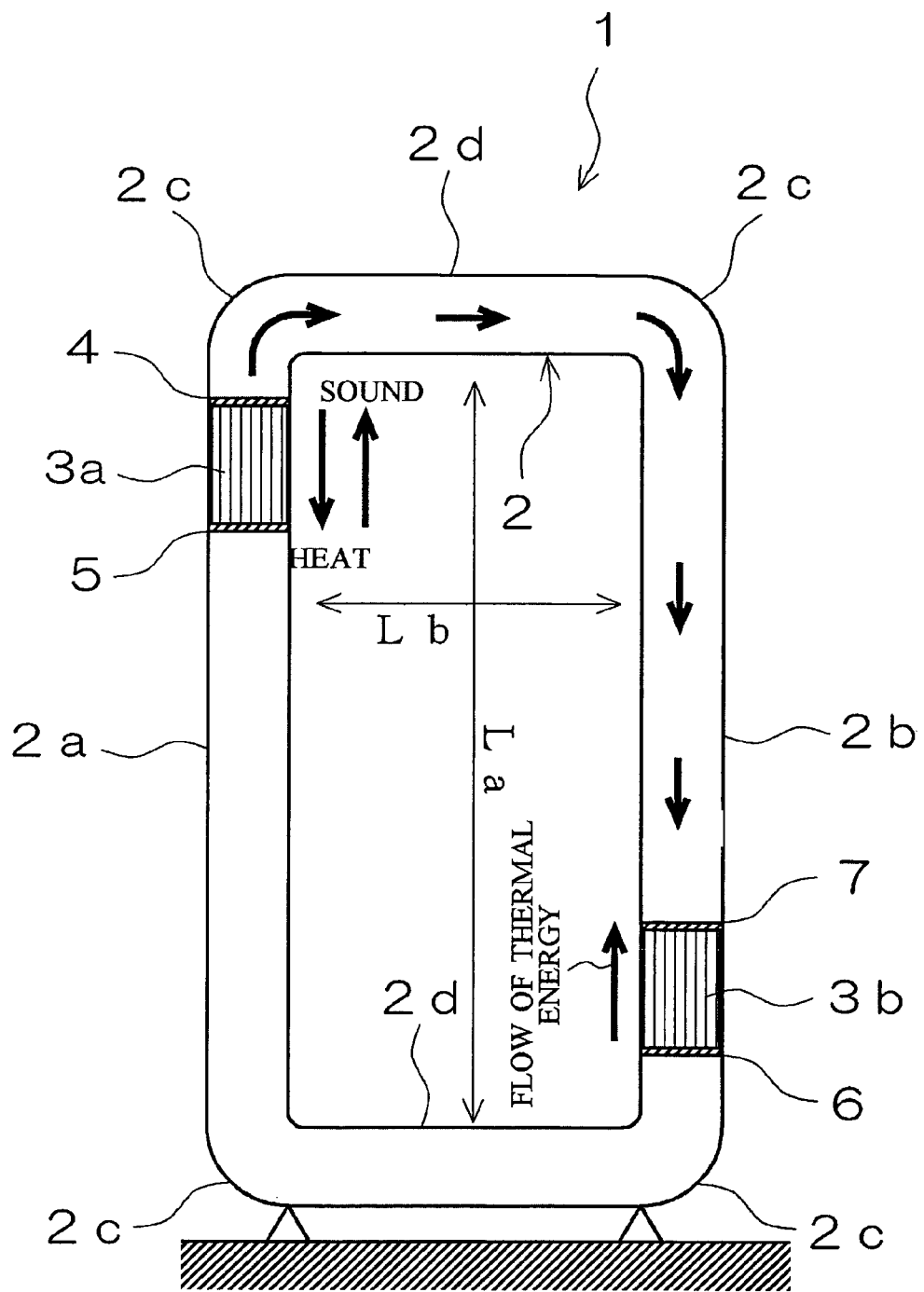
FIG. 1 is a schematic sectional diagram of an acoustic heating apparatus according to a first embodiment of the present invention.
Figure 2:
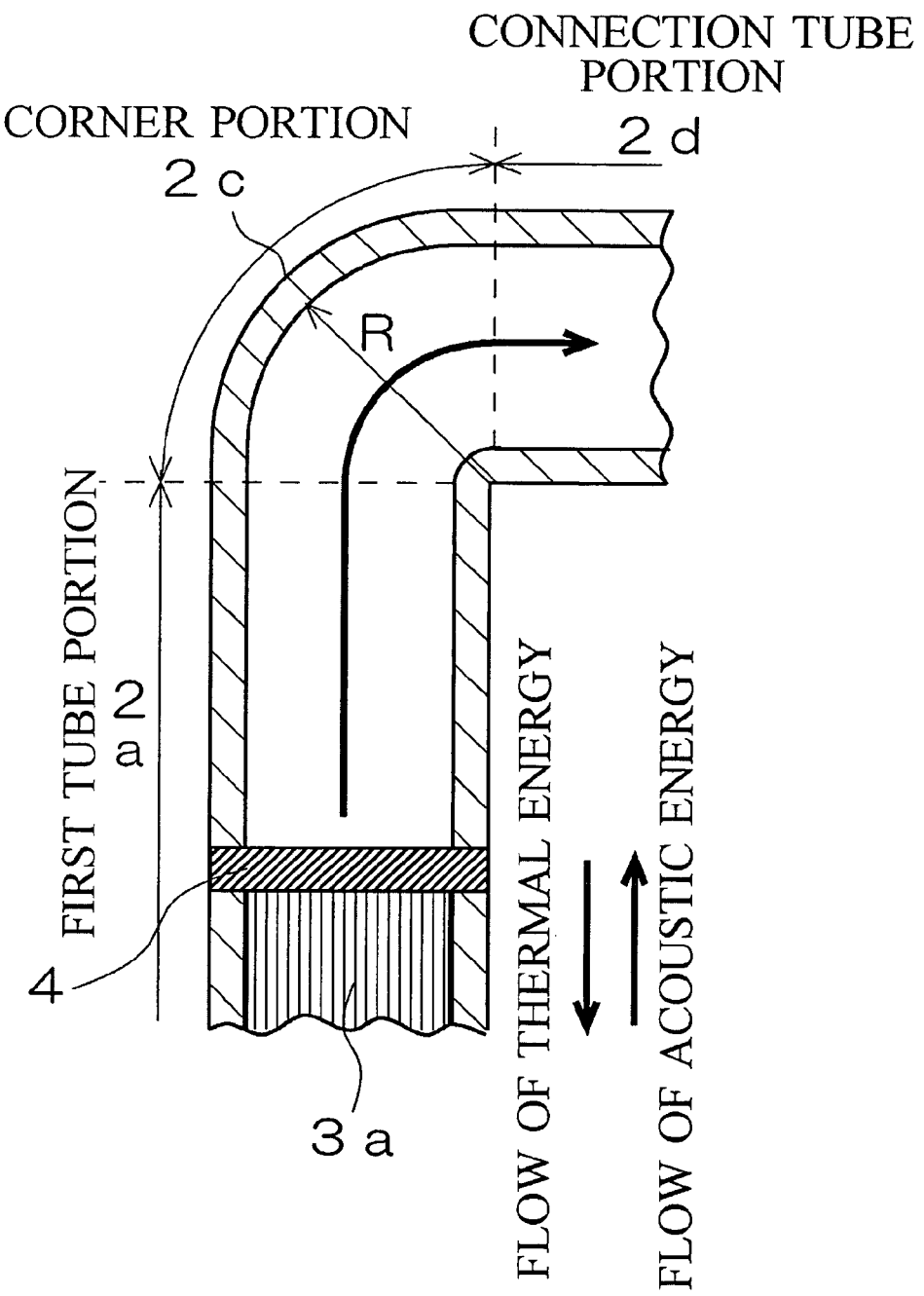
FIG. 2 is a diagram showing a magnified corner portion of a loop tube in the first embodiment.
Figure 3:
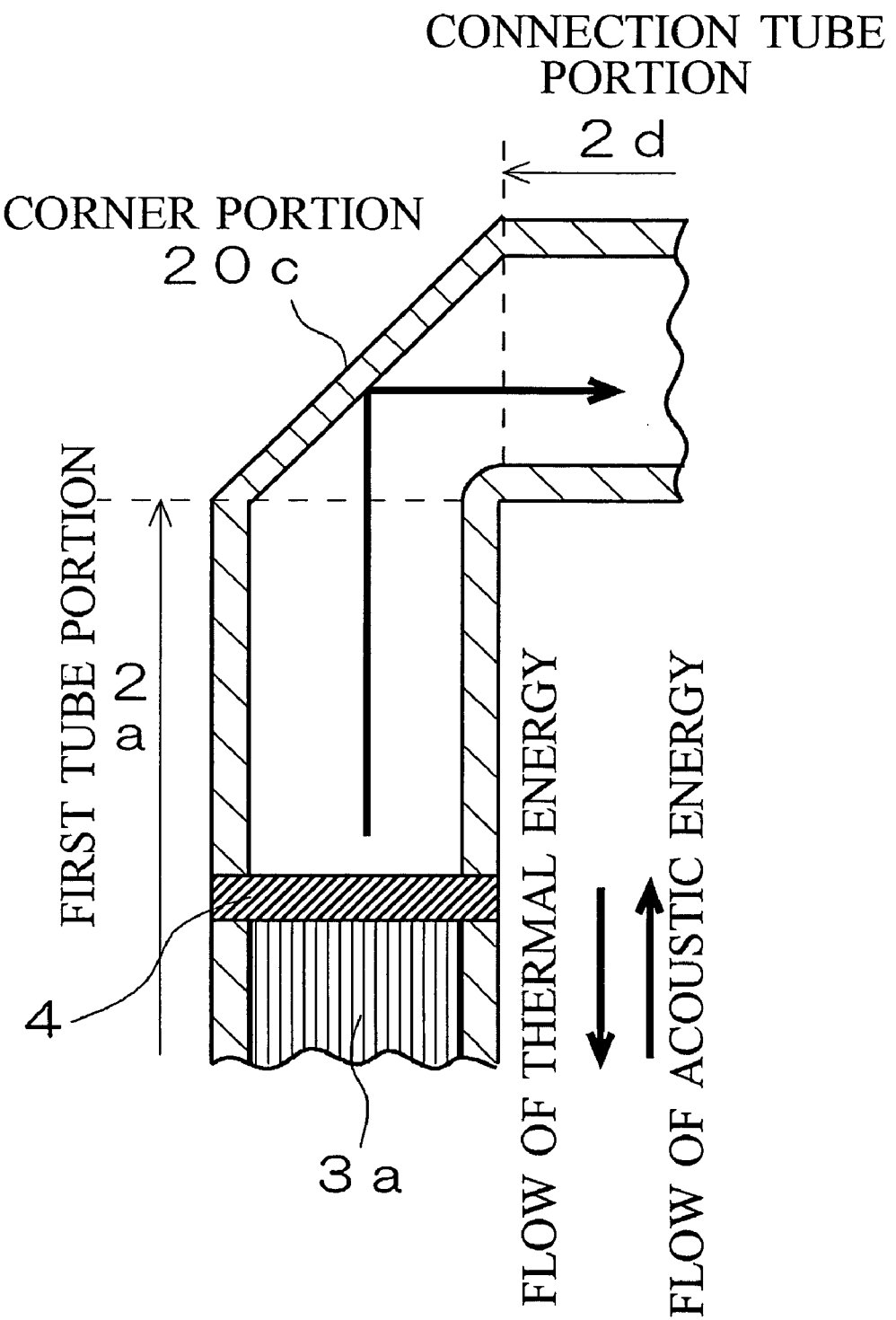
FIG. 3 is a diagram showing a magnified corner portion of a loop tube in another embodiment.
Figure 4:
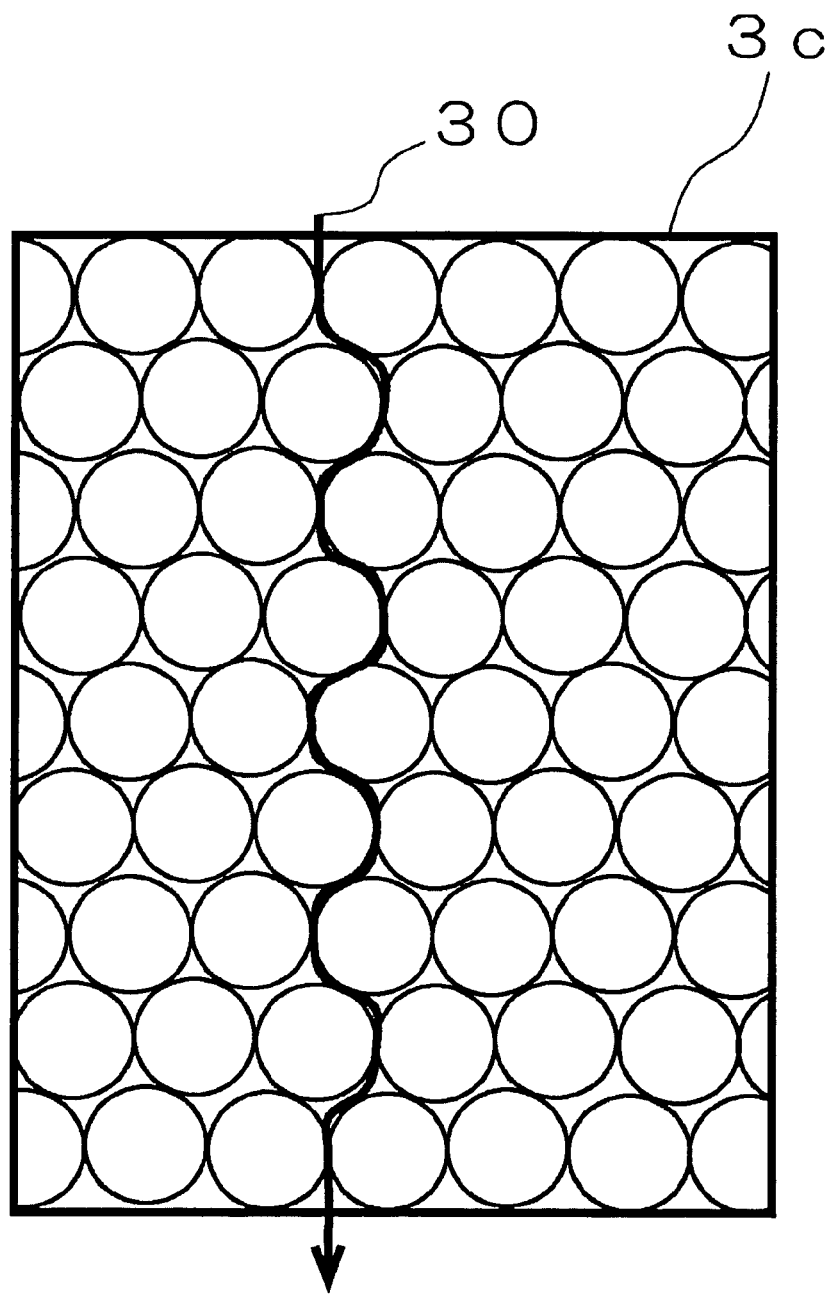
FIG. 4 is a schematic sectional diagram of a stack in the first embodiment.
Figure 5:
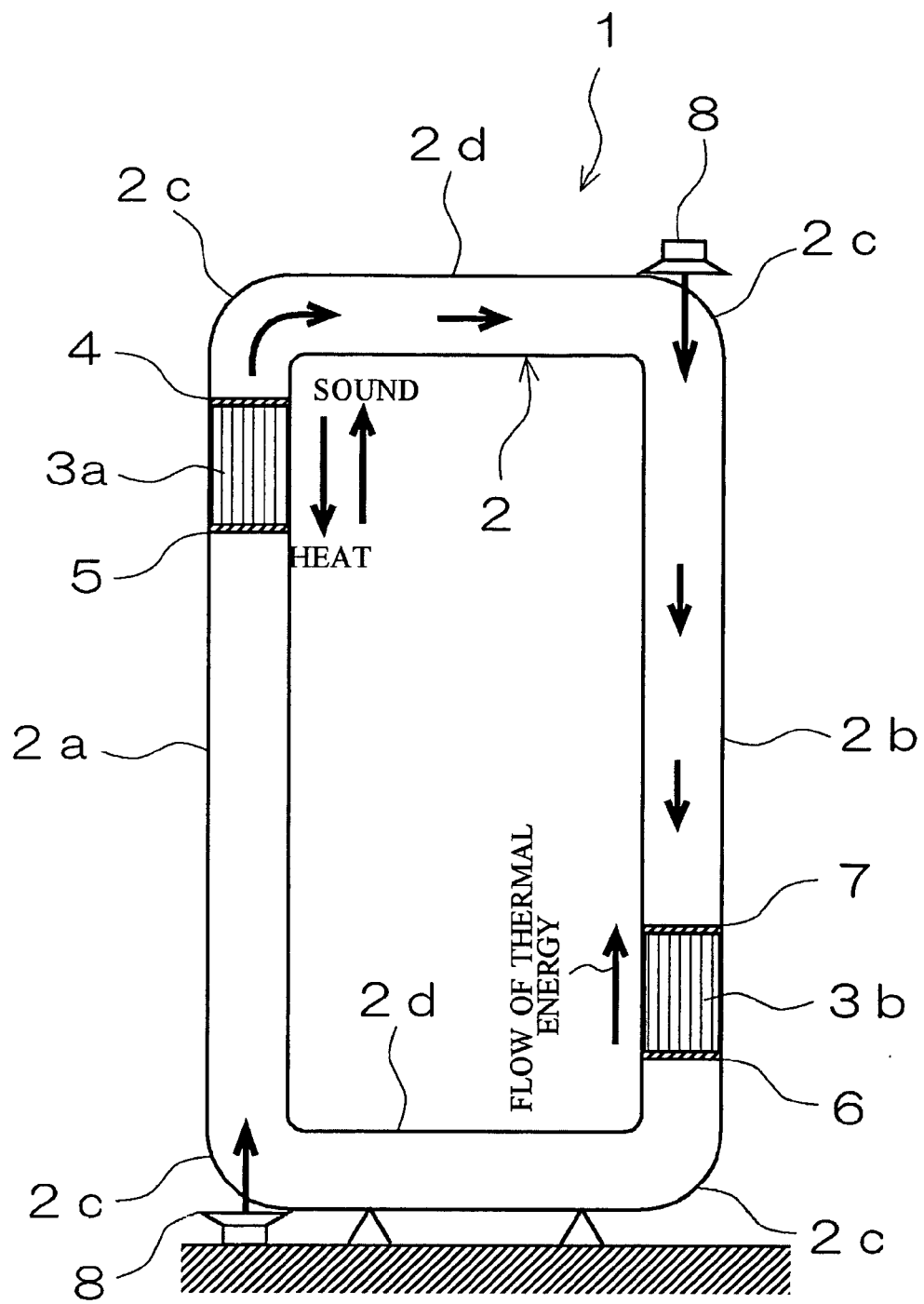
FIG. 5 is a schematic sectional diagram of an acoustic heating apparatus according to another embodiment.
Figure 6:
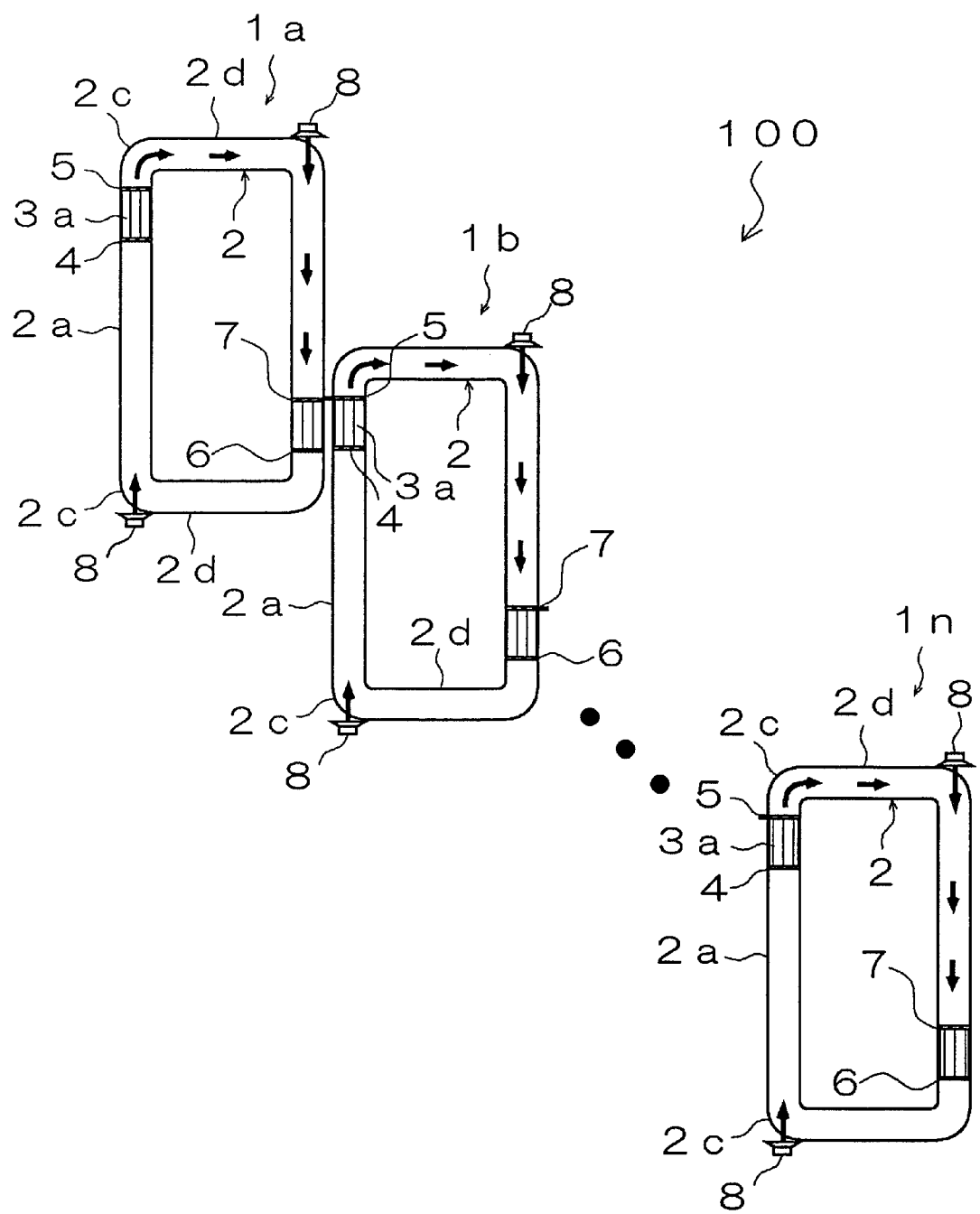
FIG. 6 is a schematic diagram of an acoustic heating system in which acoustic heating apparatuses are connected.

1 . . . acoustic heating apparatus
2a . . . first tube portion
2b . . . second tube portion
2c . . . corner portion
20c . . . corner portion of another embodiment
2d . . . connection tube portion
3a . . . first stack
3b . . . second stack
30 . . . connection channel
4 . . . high-temperature-side heat exchanger
5 . . . low-temperature input-side heat exchanger
6 . . . low-temperature-side heat exchanger
7 . . . high-temperature output-side heat exchanger
100 . . . acoustic heating system

The invention claimed is:

1. An acoustic heating apparatus comprising:
a loop tube comprising a first tube portion and a second tube portion;
a first stack sandwiched between a high-temperature-side heat exchanger and a low-temperature input-side heat exchanger provided in the first tube portion, the first stack providing channels to connect the high-temperature-side heat exchanger with the low-temperature input-side heat exchanger, a liquid being circulated around the high-temperature-side heat exchanger: and
a second stack sandwiched between a low-temperature-side heat exchanger and a high-temperature output-side heat exchanger provided in the second tube portion, the second stack providing channels to connect the low-temperature-side heat exchanger with the high-temperature output-side heat exchanger, the liquid being circulated around the low-temperature-side heat exchanger,
wherein a temperature gradient is generated in the second stack by propagating a standing wave and a traveling wave generated in the loop tube from the first stack to the second stack, and heat is output from the high-temperature output-side heat exchanger disposed on the second stack side.

2. The acoustic heating apparatus according to claim 1, wherein the loop tube comprises the first tube portion and the second tube portion, which are disposed while standing relative to the ground, and connection tube portions connecting the first tube portion to the second tube portion.

3. The acoustic heating apparatus according to claim 2, wherein the first stack disposed in the first tube portion is located at a level higher than the level of the second stack disposed in the second tube portion.

4. The acoustic heating apparatus according to claim 2, wherein the heat exchangers disposed on the first stack side are the high-temperature-side heat exchanger and the low-temperature input-side heat exchanger in that order from above.

5. The acoustic heating apparatus according to claim 1, wherein when one end of a linear tube portion is connected to one end of the connection tube portion, an intersection of the respective center axes is assumed to be a start point of a circuit, and an entire length of the circuit is assumed to be 1.00, the center of the first stack is set at a position corresponding to 0.28±0.05 relative to the entire length of the circuit.

6. The acoustic heating apparatus according to claim 1, wherein when an entire length of the circuit is assumed to be 1.00, a first peak of the pressure variation of a working fluid along the circuit is present in the vicinity of the first stack, and a second peak is present at a position corresponding to about one-half the entire length of the circuit, the second stack is disposed in such a way that the center of the second stack is positioned past the second peak.

7. The acoustic heating apparatus according to claim 2, wherein the first tube portion and the second tube portion are set to be longer than the connection tube portion.

8. The acoustic heating apparatus according to claim 2, wherein the shapes of corner portions at the boundaries between the first tube portion and the corner portion and between the second tube portion and the corner portion are shapes suitable for totally reflecting the standing wave and the traveling wave between the connection tube portion and the tube portions.

9. The acoustic heating apparatus according to claim 2, wherein an acoustic wave generator for generating a standing wave and a traveling wave is disposed on the outer perimeter portion or in the inside of the loop tube.

10. The acoustic heating apparatus according to claim 1, wherein the first stack or/and the second stack include meandering connection channels.

11. The acoustic heating apparatus according to claim 1, wherein a material for the first stack or/and the second stack is composed of at least one type of ceramic, sintered metal, gauze, and nonwoven metal fabric, and the $\omega\tau$ ($\omega$: an angular frequency of the working fluid, $\tau$: temperature relaxation time) thereof is configured to become within the range of 0.2 to 20.

12. An acoustic heating system comprising a plurality of acoustic heating apparatuses according to claim 1, wherein a high-temperature output-side heat exchanger in one acoustic heating apparatus is connected to a high-temperature-side heat exchanger in another acoustic heating apparatus adjacent thereto.

* * * * *